Nov. 1, 1955 G. W. SMITH 2,722,124
CAGING SYSTEM FOR GYROSCOPES
Filed May 24, 1954 3 Sheets-Sheet 1

GENE W. SMITH,
INVENTOR.

BY
Barkelew & Scantlebury
ATTORNEYS.

Nov. 1, 1955          G. W. SMITH          2,722,124
CAGING SYSTEM FOR GYROSCOPES
Filed May 24, 1954                    3 Sheets-Sheet 2
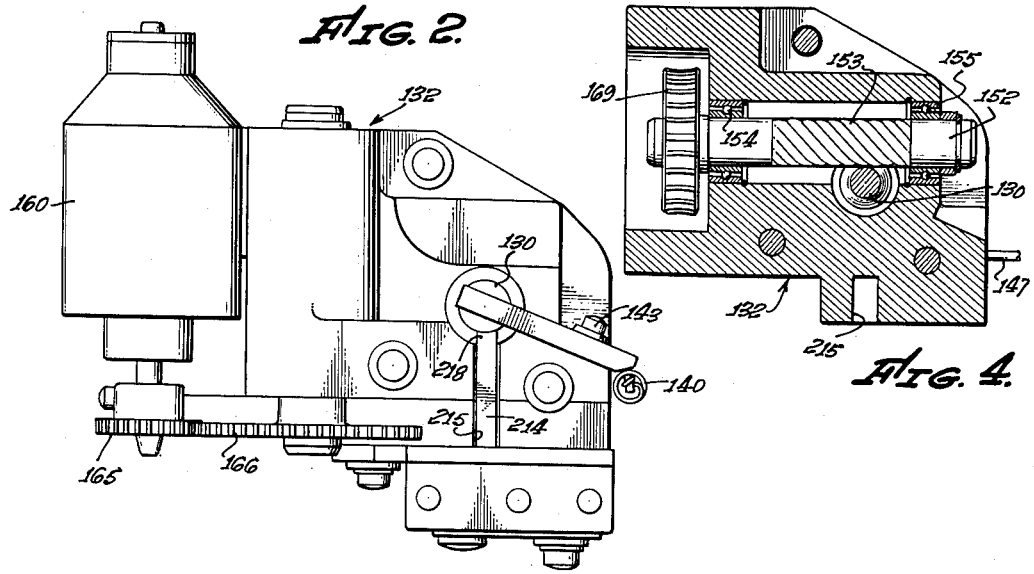
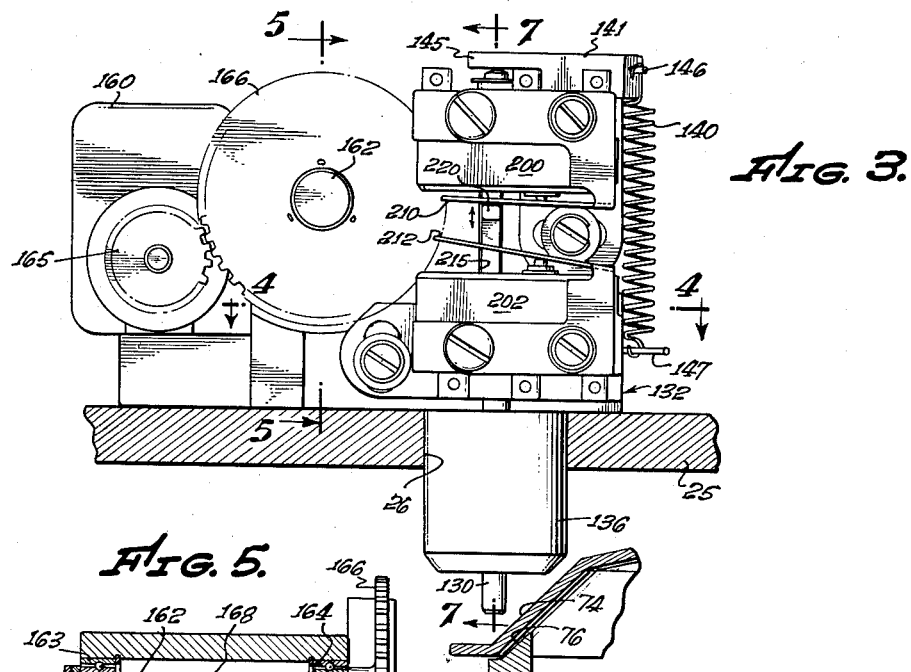
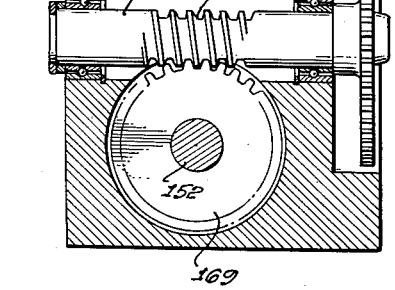
GENE W. SMITH,
INVENTOR.
BY
Bartelew + Scantlebury
ATTORNEYS.

Nov. 1, 1955 G. W. SMITH 2,722,124
CAGING SYSTEM FOR GYROSCOPES
Filed May 24, 1954 3 Sheets-Sheet 3
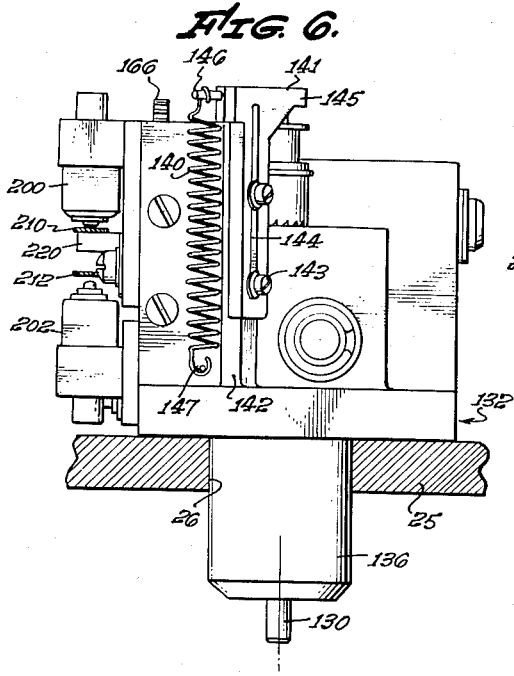
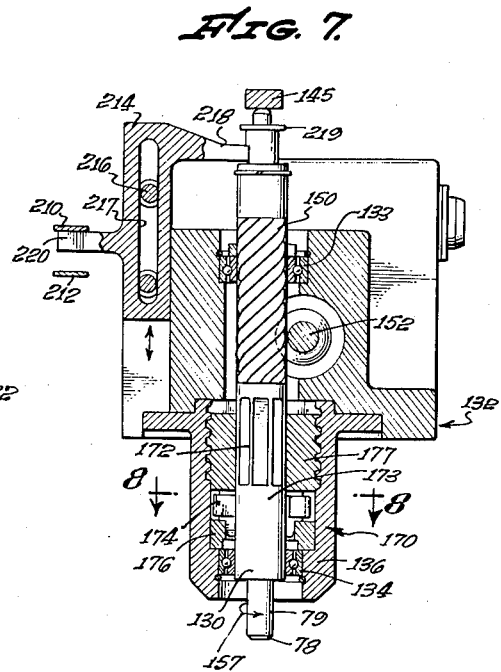
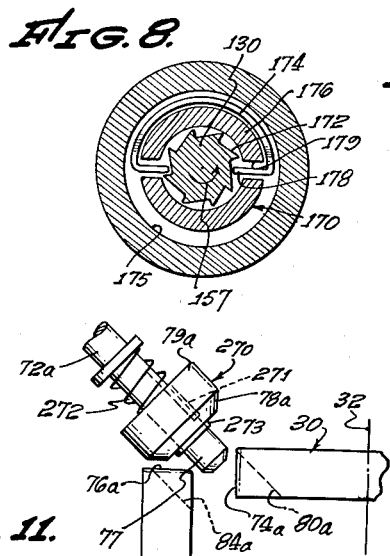
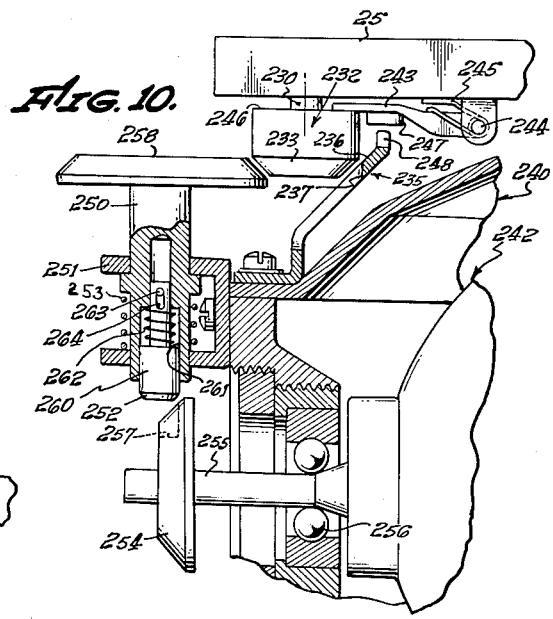
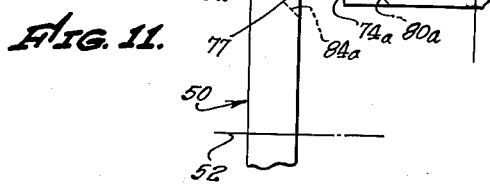
GENE W. SMITH,
INVENTOR.
BY
Barbelew + Scantlebury
ATTORNEYS.

United States Patent Office 2,722,124
Patented Nov. 1, 1955

2,722,124

CAGING SYSTEM FOR GYROSCOPES

Gene W. Smith, La Canada, Calif., assignor to G. M. Giannini & Co. Inc., Pasadena, Calif., a corporation of New York Application May 24, 1954, Serial No. 431,971

31 Claims. (Cl. 74—5.1)

This invention is concerned generally with mechanism for caging a gyroscope.

Caging systems in accordance with the invention may be used for caging gyroscopes of many different types. Some aspects of the invention pertain only to gyroscopes in which the rotor axis has two rotational degrees of freedom with respect to which it is to be caged; while other aspects of the invention pertain also to gyroscopes in which the rotor axis has only one degree of rotational freedom, or is to be caged only with respect to one degree of freedom.

The invention provides means for orienting the rotor axis about one or both gimbal axes to a definitely predetermined caging position, and for releasably locking, or caging, the rotor axis in that position. A particular advantage of mechanism in accordance with the invention is that it may conveniently be controlled from a position remote from the gyroscope itself. In preferred form of the invention, such control may, for example, require only the closure of a single electric circuit to produce caging action and opening of the same circuit to release the gyroscope from caged condition.

A further advantage of the invention is that the caging mechanism may be entirely self-sufficient, and is not dependent for effective operation upon the action of a gyroscope erecting system, for example, nor upon any particular orientation of the gyroscope case.

Furthermore, the invention is capable of correctly orienting the gyroscope gimbals from any initial position within the full 360° of their movement.

A further advantage of the invention is that the gimbal or gimbals are required to carry remarkably little mechanism, consisting typically of only a single part rigidly mounted on each gimbal. The remainder of the mechanism can conveniently be provided in the form of a compact, self-contained unit. Moreover, substantially the whole of the latter mechanism may be mounted outside of the gimbals, and even outside of the fixed housing.

In preferred form of the invention the only moving part of the caging mechanism that needs to be located within the fixed housing is a single member. That member will be referred to for convenience as a spindle, but without thereby implying any limitation upon its form. That spindle is rotatable about its axis to drive the gimbals successively or simultaneously to caging positions, and is movable axially in one direction to lock the gimbals in caging positions and in the other direction to release the gimbals. Since no other types of movement are required of the spindle, the amount of space that must be provided for it within the housing may be very small. Moreover, the relatively simple movements required of the spindle greatly facilitate the sealing of the aperture through which it enters the case, should such sealing be required.

A further important aspect of the invention has to do with particularly economical and effective mechanism for driving the caging spindle in the required types of movement. In preferred form of such driving mechanism, both the rotary and the axial movements required for the caging operation are driven by a single motor, and the opposite axial movement required for the uncaging operation is driven by reverse operation of the same motor. The invention provides uncaging action of that type in a particularly positive manner that typically permits completion of the uncaging operation during a time that is of the order of 0.1 second.

A full understanding of the invention and of its further objects and advantages will be had from the following description of certain embodiments, of which description the accompanying drawings form a part. Those embodiments are only illustrative of the invention, and are not intended as a limitation upon its scope.

In the drawings:

Figs. 2 to 9 represent a preferred embodiment of drive mechanism for a caging system in accordance with the invention, wherein:

Figure 9:
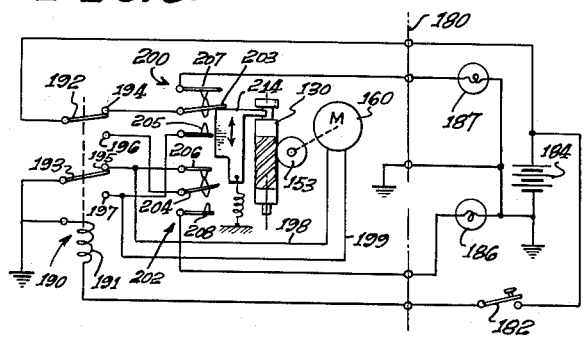

Fig. 2 is a plan;
Fig. 3 is a side elevation;
Fig. 4 is a horizontal section on line 4—4 of Fig. 3;
Fig. 5 is a vertical section on line 5—5 of Fig. 3;
Fig. 6 is an end elevation;
Fig. 7 is a vertical section on line 7—7 of Fig. 3;
Fig. 8 is a horizontal section on line 8—8 of Fig. 7; and
Fig. 9 is a schematic diagram of illustrative electrical connections;
Fig. 10 is a fragmentary section corresponding to a portion of Fig. 1 and representing a modification; and
Fig. 11 is a fragmentary section representing another modification.

Figure 1:
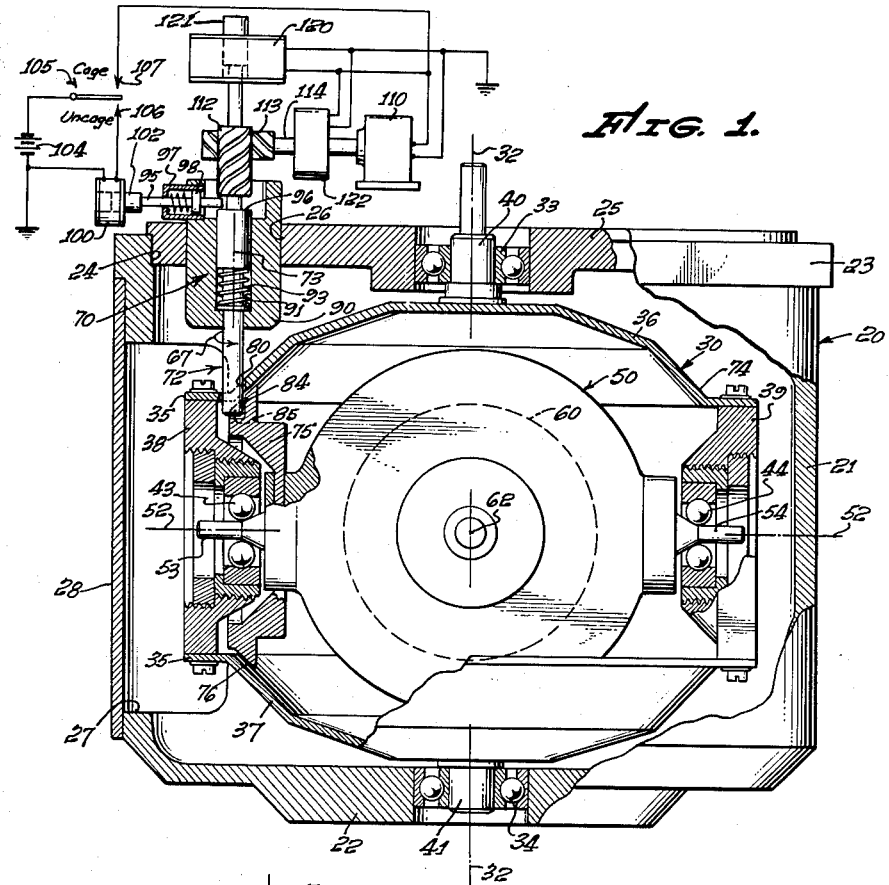
Fig. 1 is a vertical section, partly schematic, representing an illustrative embodiment of the invention in caging position.

Fig. 1 represents in somewhat schematic form an illustrative embodiment of the invention in a gyroscope which is representative of one type with which the present invention may be used. That gyroscope is shown in an orientation such as would be appropriate, for example, for an aircraft gyroscope for indicating roll and yaw, the direction to the left in Fig. 1 then being forward in the aircraft. For the sake of clarity, the invention will be described with reference to that particular orientation, but without implying any limitation as to orientation in the operation of the described embodiment, or in modifications of that embodiment. On the contrary, it is emphasized that an important advantage of the invention is its ability to operate in any orientation and even under conditions of changing orientation.

A fixed housing is indicated generally at 20, comprising a vertical cylindrical shell 21 with its lower end closed by the wall 22. The upper end of housing 20 carries a square external mounting flange 23, and has a circular opening 24 in which a mounting plate 25 is removably fixed, as by screws not shown. An access aperture 27 is shown in cylindrical wall 21, and may be closed by a closure plate indicated at 28.

The outer gimbal of the gyroscope, indicated generally by the numeral 30 is journaled on a vertical outer gimbal axis 32 on upper and lower journal bearings 33 and 34, mounted coaxially of the housing in mounting plate 25 and end wall 22, respectively. Outer gimbal 30 may be of any suitable structural form. As shown, it comprises typically upper and lower generally circular frame members 36 and 37, which are somewhat dished outward in such a way that they approximate polar zones of a spherical shell. Frame members 36 and 37 are peripherally flanged at 35 and are rigidly connected in axially spaced relation by two generally rectangular end plates 38 and 39. Pivot studs 40 and 41 are rigidly mounted coaxially on the outer faces of frame members 36 and 37, respectively, and are received by journal bearings 33 and 34. Outer gimbal 30 is thereby mounted in housing 20 for rotation about outer gimbal axis 32 throughout 360°. End plates 38 and 39 are centrally apertured to receive the respective journal bearings 43 and 44 for the inner gimbal.

The inner gimbal, indicated generally at 50, comprises a substantially closed housing, which may be of generally spherical form, and which carries two oppositely positioned radial pivot studs 53 and 54. Those pivot studs, which define an inner gimbal axis 52, are received, respectively, in journal bearings 43 and 44. The latter bearings define the position of inner gimbal axis 52 with respect to outer gimbal 30, inner and outer gimbal axes 52 and 32 intersecting perpendicularly and establishing a gimbal axis plane, which is the plane of the section in Fig. 1. Inner gimbal 50 is rotatable throughout 360° about axis 52.

The gyroscope rotor, indicated schematically at 60 in Fig. 1, is journaled with respect to inner gimbal 50 on a rotor axis 62, which is normal to the gimbal axis plane (normal to the paper in Fig. 1) at the intersection of the two gimbal axes. The rotor may be driven in any suitable manner, not specifically shown, for example by electric power brought in through slip rings of conventional type which accommodate gimbal rotation. Indicating or control means may be provided, responsive to gimbal rotation about one or both of the described gimbal axes. Such indicating or control means may be of many different types, depending upon the service for which the gyroscope is intended, but are not in themselves a part of the present invention and have been omitted in the drawings for clarity of illustration. Each gimbal, together with all its carried structure, is preferably accurately balanced with respect to its gimbal axis, balancing means for that purpose being omitted in the present drawings for clarity of illustration.

The illustrative embodiment of caging means in accordance with the invention, indicated generally at 70 in Fig. 1, comprises a caging spindle 72 journaled on frame 20 for rotary and axial movements with respect to a spindle axis 73, cooperating driving and locking formations on the caging spindle and on the respective gimbals, and control means for driving the rotary and axial movements of the spindle.

Each gimbal carries structure forming a surface of revolution with respect to the gimbal axis. In the present embodiment, such a surface is provided for outer gimbal 30 by the outer conical surface 74 of upper frame member 36. Inner gimbal 50 carries a special caging member 75, the periphery of which includes a surface 76 of conical form. That surface is preferably so positioned that a portion of it lies closely adjacent a portion of outer gimbal surface 74, those two surface portions being preferably substantially parallel, with one surface immediately inward of the other. Caging spindle 72 is so located that its axis 73 obliquely intersects the two adjacent portions of surfaces of revolution 74 and 76. As shown, spindle axis 73 is substantially parallel to one gimbal axis and perpendicular to the other. That relation is particularly convenient and effective, but is not necessary (see, for example, Fig. 11).

Spindle 72 carries a driving formation adapted to frictionally engage at least one, and preferably both, of the gimbal surfaces 74 and 76, such engagement taking place, as will be described, by virtue of successive axial movements of the spindle. That driving formation may, for example, comprise the periphery of a wheel rigidly mounted on, or otherwise driven with, the spindle (see, for example, the wheel 232 of Fig. 10). As shown in Fig. 1, the driving formation comprises a generally conical surface 78 formed directly on the body of spindle 72 by chamfering its flat lower end.

Figure 1A:
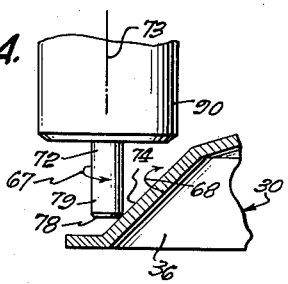
Fig. 1A is a fragmentary section corresponding to a portion of Fig. 1 and showing the mechanism during the operation of orienting the outer gimbal.

In normal uncaged operation of the gyroscope, the axial position of spindle 72 is such that driving surface 78 is spaced above outer gimbal surface 74, leaving both gimbals free to rotate through 360° about their respective gimbal axes. To initiate caging action, spindle 72 is advanced, as by means to be described, axially downward to bring its driving surface 78 into frictional engagement with outer gimbal surface 74 (Fig. 1A); and is caused to rotate about its axis 73, for example in the direction indicated by the arrow 67. That spindle rotation exerts on outer gimbal 30 a torque about its axis 32 in the typical direction indicated by the arrow 68. That torque is preferably yielding in its nature, as is typically the case with the frictional engagement described. It will be understood without specific illustration that the coefficient of friction between surfaces 74 and 78 may be controlled by suitable selection of the materials of which they are formed, and that the driving connection between those surfaces may be made positive, if desired, as by providing them with conventional gear teeth. The resulting torque, whether yielding or positive in nature, causes outer gimbal 30 to swing about its axis 32 until it reaches a predetermined caging position. During that action, inner gimbal 50 remains rotationally free. If rotor 60 is in operation, the inner gimbal is therefore typically caused to precess relatively rapidly about its axis 52, bringing rotor axis 62 into alignment with outer gimbal axis 32. That action has the advantage that it leaves outer gimbal 30 substantially free of restraint by gyroscopic action of the rotor, greatly facilitating any further movement of the outer gimbal that may be required to bring the latter into caging position.

Locking means are also provided, which act to lock the outer gimbal in caging position with respect to the frame. In accordance with an important aspect of the invention, those locking means include a recess formed in surface of revolution 74 in such position that when the outer gimbal is in its predetermined caging position the recess is directly opposite driving surface 78 and permits further axial advance of the spindle. Such a recess is indicated at 80. The locking means further include cooperating locking formations on the gimbal and on the frame, which formations are brought into locking relation by virtue of that further axial advance of the spindle. Many different types of latch are known that are responsive to translational movement of a control member, such as spindle 72. It is preferred, however, that the locking formations comprise a locking surface 79 carried directly by spindle 72 and suitable opposed faces 81 on the gimbal adapted to receive cylindrical surface 79. As shown, spindle locking surface 79 is a substantially cylindrical surface formed directly on the spindle immediately adjacent driving surface 78, and the cooperating faces 81 on the gimbal are opposed inner wall faces of recess 80.

With that preferred structure, the same axial advance of spindle 72 that inserts driving face 78 into recess 80 also causes locking engagement of spindle face 79 and opposing walls 81 of the recess. Continuing axial movement of the spindle, in the present embodiment, brings spindle driving face 78 into frictional engagement with surface of revolution 76 of the inner gimbal, as shown typically in Fig. 1B. Continued spindle rotation, which does not affect the described locking of the outer gimbal, then causes inner gimbal 50 to rotate about its axis 52 in the typical direction indicated by the arrow 69. The driving connection between the spindle and inner gimbal is preferably of a yielding type, as by frictional contact of the engaged faces, but may be made effectively positive in action, if desired. Rotation of the inner gimbal is continued until it reaches a predetermined caging position.

Figure 1B:
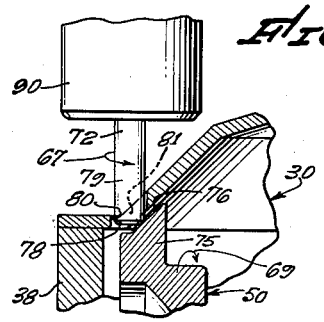
Fig. 1B is a fragmentary section corresponding to Fig. 1A and showing the mechanism during orientation of the inner gimbal.

Locking means of any suitable type are provided, capable of locking the inner gimbal in caging position, once that position has been reached. Although many types of releasable locking means are known, it is preferred to utilize as a latch for the inner gimbal a suitable formation carried directly by spindle 72 and made effective by axial advancement of the spindle beyond its described driving engagement with the inner gimbal (Fig. 1B). As shown, a recess 84 is provided in inner gimbal surface 74 in position to receive spindle driving surface 78 when the inner gimbal (as well as the outer gimbal) is in caging position. Recess 84 then permits further axial advance of the spindle, thereby producing locking engagement of the spindle and inner gimbal (Fig. 1). As shown, the locking formations thereby engaged comprise the substantially cylindrical surface 79 of spindle 72 (the action of which in locking the outer gimbal has already been described) and opposed inner wall faces 85 of recess 84. Spindle locking surface 79 may be tapered if desired, the pairs of opposed locking faces 81 and 85 of the respective gimbals being then preferably so spaced that they closely fit the tapered spindle only in fully advanced caging position of the latter (Fig. 1). Particularly if the locking surface is tapered, one and the same spindle surface may perform the dual function of driving and locking.

To uncage the gyroscope, the two sets of locking formations, by which the respective gimbals are locked in caging position, are released in any suitable manner, and the spindle driving formation 78 is withdrawn from the two recesses 80 and 84. An advantage of the described type of locking formations is that withdrawal of the spindle end from recesses 80 and 84 automatically disengages spindle locking surface 79 from surfaces 81 and 85 of the respective gimbals. Accordingly, with the described preferred type of locking means, the gyroscope can be completely uncaged by the very simple operation of withdrawing spindle 72 upward to a position (not explicitly shown) just above the position of Fig. 1A. That uncaging movement of the spindle may involve axial movement only; but an advantage of the described type of locking formations is that rotation of the spindle may take place either during caged condition of the gyroscope or during the uncaging operation without interfering with the locking or releasing action.

For clarity of illustration, appreciable clearance is shown between locking surface 79 of the spindle and the walls of apertures 80 and 84. However, particularly if the spindle surface is somewhat tapered, the fit of those surfaces may in practice be very close, and may provide correspondingly precise definition of the caged position of the gimbals. Also, the radius of inner gimbal member 75 may be made larger than is shown in the drawings, the inner surface of outer gimbal member 36 being cut away to maintain clearance. In that way the radial spacing between the two gimbal driving surfaces 74 and 76 at their points of engagement by the spindle may be made very small. That has the advantage during uncaging of the gyroscope that the inner and outer gimbals are released effectively simultaneously.

The described movements of spindle 72 may be produced and controlled in any suitable manner. One illustrative embodiment of mechanism for producing and controlling such movements is shown somewhat schematically in Fig. 1. As shown, spindle 72 is journaled for rotary and axial movements in a vertical axial bore 91 of a housing 90. That housing is rigidly and accurately mounted in a suitable aperture 26 in mounting plate 25, through which the lower end of the housing and also the lower end of the spindle extend into the main housing of the gyroscope. Resilient means of any suitable type, shown as the coil spring 93, yieldingly urges the spindle upward out of caging position. A latch is provided for releasably locking the spindle in caging position against the force of spring 93. As shown, that latch comprises a plunger 95, slidably mounted in a transverse bore of housing 90, and a radial channel 96 formed in spindle 72 in position to receive the inner end of latch plunger 95 when the spindle is in fully caging axial position. Plunger 95 is yieldingly urged toward latching position in any suitable manner, as by the coil spring 97 which acts against the outer face of a plunger flange 98. Means are also provided for controllably releasing the latch, such means being illustratively shown as the fixedly mounted latch solenoid 100 in which an armature 102, fixed on plunger 95, is axially slidable. Armature 102, in the particular embodiment shown, draws plunger 95 outward out of engagment with channel 96 in response to energization of solenoid 100. The solenoid may be connected, for example, in series with a source of voltage, represented as the battery 104, and one contact 106 of a double throw control switch 105. Closure of switch 105 to contact 106 then energises solenoid 100, drawing latch plunger 95 outward against the yielding force of latch spring 97 and disengaging the latch. Spindle 72 is thereby released for axial movement under the force of spring 93 out of caging position.

During caging operation, spindle 72 is driven in rotation, as by the electric motor 110, which may act through a driving connection of any type that permits the described axial movement of the spindle. As shown, that driving connection comprises the two helical gears 112 and 113, fixedly mounted on the spindle and on the driving shaft 114, respectively. Spur gears of suitable axial dimensions, for example, might be used alternatively. An advantage of employing helical gears for driving the caging spindle is that they provide a desirable dual action of inducing both rotary movement and axial movement, the ratio of those movements being variable in accordance with the respective resistances that they encounter. The hand of the helical gears is so selected that rotary driving of the spindle in the direction employed for caging operation, typically shown by arrow 67, is accompanied by a yielding axial force on the spindle in a direction to advance the described driving and locking formations of the spindle into engagement with the cooperating formations on the gimbals. Driving shaft 114 is shown in transverse relation to spindle 72, but it may, for example, comprise a sleeve coaxially surrounding the spindle and linked to it by helical structure such as a helical spline. The term helical gear is used herein in the sense of including such helical structure yielding equivalent action. In certain of its broader aspects, that feature of the invention is more fully described and is claimed in the copending patent application for "Caging Mechanism for Gyroscopes," Serial No. 431,810, filed on May 24, 1954, by Alfred J. Klose, and assigned to the same assignee as the present invention.

In the present embodiment, sufficient axial force must be applied to the caging spindle during caging operation to overcome the force of spring 93 and also to maintain driving surface 78 of the spindle in effective driving relation with gimbal surfaces 74 and 76. While sufficient axial force for that purpose may be obtainable from a helical gear drive, it is preferred to provide means for controllably exerting additional downward force of a yielding nature upon the spindle during caging and for removing that force either upon completion of caging or upon initiation of uncaging action. As shown, such downward force is provided by the spindle solenoid 120, which acts on an armature 121 fixedly mounted in coaxial relation on the upper end of spindle 72 in a manner to yieldingly urge downward axial movement of the spindle in response to energization of the solenoid. The lengths of armature 121 and of the solenoid coil are sufficient to insure effective action throughout the axial travel of the spindle. Solenoid 120 may be connected in series, or, as shown, in parallel with motor 110 between ground and the second contact 107 of double throw switch 105, already described.

Switch closure to caging contact 107 then energizes motor 110 to drive spindle 112 in rotation; and solenoid 120 is simultaneously energized to drive the spindle yieldingly in axial translation with compression of spring 93, the latter action being preferably aided by the described dual action of helical gears 112 and 113 in those instances in which such gears are employed. The spindle is thereby caused to successively engage the surfaces of revolution 74 and 76 of the respective gimbals, driving each gimbal during that engagement to its predetermined caging position, and then advancing axially to lock the positioned gimbal. Upon completion of that caging action, spindle channel 96 comes opposite latch plunger 95, which is advanced by spring 97 into engagement with the channel, latching the spindle in caging position. Continued driving of the spindle for a moderate time after caging has been thus completed is permissible, since the spindle is restrained from rotation only by friction. It is therefore not necessary, although it may be desirable, to provide automatic limit controls, such as limit switches, for the driving circuit, as will be described in another embodiment. As shown in Fig. 1, the operator may simply hold switch 105 closed to caging contact 107 until caging is observed to be complete, as indicated, for example, by inward movement of latch plunger 95. The switch may then be opened, and the gyroscope will remain caged.

Uncaging action takes place, as already indicated, in response to momentary closure of switch 105 to uncaging contact 106. That action releases latch 95, permitting spring 93 to move the spindle axially upward. When helical gears are employed, as illustrated, upward axial movement of the spindle is necessarily accompanied by rotation of at least one of the gears 112 and 113. In practice, rotation of driving shaft 114 and its gear 113 may be restrained by the friction and moment of inertia of motor 110 and the connecting mechanism, which may typically include a gear train, not explicitly shown. On the other hand, gear 112 is typically restrained from rotation substantially only by the moment of inertia of spindle 72, usually permitting satisfactorily rapid uncaging with the system as so far described. However, the time required for uncaging may be coniderably reduced by providing means for disconnecting gear 113 from its driving connection to motor 110 during uncaging. That may be done, for example, by including in that connection a magnetic clutch, represented schematically at 122, and supplying current to that clutch to engage it only during operation of motor 110. The clutch may be connected, for example, in parallel with motor 110 and spindle solenoid 120, as illustrated. Since the combined moment of inertia of gear 113, driving shaft 114 and the clutch member to which the latter is connected may typically be made smaller than that of spindle 72, release of clutch 122 permits uncaging movement of the spindle to be accommodated primarily by rotation of gear 113, and requires relatively little spindle rotation, or none at all. The time required for uncaging with mechanism of the present type is thereby reduced. In mechanism utilizing spur gears, for example, in place of helical gears 112 and 113, the clutch 122 would be omitted.

A preferred type of driving and control means for a caging mechanism in accordance with the invention is represented in Figs. 2 to 9. A caging spindle is shown at 130, journaled in a housing 132 by means of the upper and lower ball bearings 133 and 134. The spindle is freely slidable axially with respect to the bearings 133 and 134. The lower portion of spindle 130 may be of any suitable form (see, for example, Fig. 10), but is shown illustratively with a driving surface 78 and a locking surface 79 which are of the type already described and are adapted to cooperate with suitable formations carried by the respective gimbals, such as surfaces 74 and 76, Fig. 3, in the manner already described with specific reference to the embodiment of Fig. 1. The lower part of housing 132 typically comprises a cylindrical clutch housing 136 coaxial with spindle 130 and carrying lower bearing 134. Housing 132 may typically be mounted on the outer face of a mounting plate such as plate 25 of Fig. 1, which forms a part of the gyroscope case, with clutch housing 136 projecting downward through a fitting aperture 26 in the mounting plate and thereby defining the position of the caging mechanism.

The upper portion of spindle 130 carries helical gear teeth 150, which may, for example, be cut directly in the body of the spindle (Fig. 7). A driving shaft 152 is journaled horizontally in the body of housing 132 on bearings 154 and 155 (Fig. 4), and carries helical gear teeth 153 which mesh with spindle teeth 150. The hand of the helical gears is such that gear action to produce forward rotation of the spindle, typically indicated by the arrows 157 (Figs. 7 and 8), also tends to drive it axially downward. Driving shaft 152 is driven by a reversible electric motor 160 via a speed reducing gear train that includes the cross shaft 162, journaled on bearings 163 and 164 and driven by the motor via spur gears 165 and 166. Worm teeth 168 cut directly in cross shaft 162 engage a worm gear 169, fixedly mounted on driving shaft 152. When the described gear train includes a worm gear, as shown, driving shaft 152 is effectively locked against rotation when motor 160 is at rest, and an advantage of that action will be described.

An important feature of the present mechanism is the provision of means for permitting rotation of spindle 130 in one direction, which will be referred to as forward rotation, and for opposing, or, as in the present embodiment, preventing back rotation of the spindle. In preferred form of that feature, back rotation is prevented throughout nearly the whole of the axial travel of the spindle, but is freely permitted when the spindle is at the upper end of its travel (uncaged condition of the gyroscope). Illustrative means for providing that action comprise the over-running clutch indicated generally by the numeral 170 and shown best in Figs. 7 and 8. Ratchet teeth 172 are provided on spindle 130, as by cutting grooves of suitable cross section directly in the spindle body below helical gear teeth 150. Teeth 172 may be axial in direction, as shown, or may be helical in a direction opposite to that of helical gear teeth 150; and preferably extend downwardly on the spindle only to a definite transverse plane, below which the spindle surface is preferably smooth, as indicated at 173.

One or more ratchet dogs of any suitable type may be provided to engage teeth 172. As shown, a semicircular spring 174 is freely mounted in an annular channel 175, surrounding spindle 130 in clutch housing 136. That channel may be formed, for example, as a radial channel in the outer face of a spacing member 176, the outer wall of the annular channel comprising the wall of housing 136. The ends of spring 174 are bent radially inward to form two arms 178 which extend through radial apertures 179 in spacer 176 and yieldingly engage the spindle surface at diametrically opposite points. Spring rotation about the spindle axis is positively limited by spacer 176, which is rigidly related to clutch housing 136 in any suitable manner, as by clamping action of retaining nut 177. When spindle 130 is at the upper end of its travel, as shown in the drawings, spring arms 178 engage only the smooth surface 173, and the friction produced by their light pressure on that surface permits substantially free spindle rotation in either direction. In any lower position of the spindle, however, spring arms 178 engage ratchet teeth 172. That engagement typically has substantially no effect upon axial movement in either direction, the ends of the spindle teeth being suitably chamfered; exerts only a slight frictional restraint upon forward rotation of the spindle; and resists or, preferably, positively prevents spindle rotation in the backward direction.

The yielding downward force on spindle 130 exerted by the action of helical gears 150 and 153 as a consequence of forward rotational driving of the spindle may be sufficient to provide effective driving of the gimbals. It may be desirable, however, to provide auxiliary means that continuously urge the spindle downward with a yielding force. Susch a force may be developed by a coaxial spring, such as spring 93 of Fig. 1, but acting oppositely. In the present preferred embodiment, however, that yielding downward force is produced by a spring 140, mounted externally of housing 132, and is transmitted to the spindle by means of a slider 141. As shown, that slider is guided by a vertical external face 142 of housing 132 and by screw studs 143, which are fixed in that face and are received in a vertical slot 144 in the slider. Slider 141 has at its upper end a pressure arm 145 which bears axially against a single ball thrust bearing at the upper end of spindle 130; and a spring arm 146 to which the upper end of spring 140 is connected, its lower end being connected by the fixed pin 147 to housing 132. The force of spring 140 may be relatively light, and under some circumstances the spring and its connecting slider may be omitted altogether.

Illustrative circuit means for controlling the action of motor 160 are shown schematically in Fig. 9. For purposes of illustration that motor is shown as a direct current motor, the direction of which is reversible by reversal of the polarity of the direct current applied to it. It will be understood that if any other type of reversible driving means is substituted for such a motor, corresponding changes are to be made in the control circuit. The line 180 in Fig. 9 may represent a multiple contact connector, circuits and mechanism to the left of the line being typically directly associated with the gyroscope, and circuits and mechanism to the right of that line being typically located in any desired positions remote from the gyroscope. That remote portion of the system includes in particular the single pole, single throw control switch 182, which is closed to cage the gyroscope and is opened to uncage it; a power supply, shown illustratively as the battery 184 with its negative terminal grounded; and the two signal lamps 186 and 187, which are automatically lighted to indicate caged and uncaged conditions of the system, respectively.

Control switch 182 controls energization of a control relay 190, the relay coil 191 being connected in series with the control switch between ground and the positive side of battery 184. The relay includes two double throw switch arms 192 and 193, which are connected, respectively, to the positive side of battery 184 and to ground. Those switch arms engage the respective normally closed contacts 194 and 195 when the relay coil is not energized (switch 182 open as shown); and engage the respective normally open contacts 196 and 197 when the relay coil is energized (switch 182 closed).

The control circuit illustrated includes the upper and lower limit switches 200 and 202, each of which is a single pole double throw switch. The respective switch arms 203 and 204 normally engage the normally closed contacts 205 and 206, and are shiftable by switch actuation to the respective normally open contacts 207 and 208. Any suitable mechanism may be provided, such as that to be described, for actuating upper limit switch 200 only in response to upper (uncaged) position of caging spindle 130 and for actuating lower limit switch 202 only in response to lower (fully caged) position of the spindle. Spindle 130 is indicated schematically in Fig. 9 in upper position, with switch 200 actuated and switch 202 unactuated.

In the circuit shown, normally open switch contacts 207 and 208 are connected to uncaged signal light 187 and to caged signal light 186, respectively, the other terminal of each light being grounded. Normally closed switch contacts 205 and 206 are connected to relay switch contacts 197 and 195, respectively. Limit switch arms 203 and 204 are connected to relay switch contacts 194 and 196, respectively. Motor 160 is connected via lines 198 and 199 to relay switch contacts 195 and 197, respectively. Those connections are such that connection of line 198 to ground and of line 199 to a source of positive voltage produces motor rotation in a direction to drive spindle 130 in forward rotation; and opposite connection of those lines produces opposite motor rotation.

In the embodiment of Figs. 2 to 8, limit switches 200 and 202 are shown as conventional micro-switches with actuating spring arms 210 and 212, respectively. The switches are mounted in vertically opposed relation on housing 132. A switch actuating slider 214 is slidably mounted in a vertical channel 215 in housing 132, and is guided by the screw studs 216 which work in a slot 217 of the slider. A transverse arm 218 at the upper end of slider 214 carries a yoke that enters the relatively wide circumferential channel 219. The axial play of yoke arm 218 in channel 219 is such that the vertical travel of spindle 130 produces corresponding travel of slider 214 that is positive in nature but through a distance that is controllable independently of the spindle travel. A switch actuating arm 220 is rigidly mounted on slider 214 and extends between switch actuating springs 210 and 212 in such position that limit switches 200 and 202 are actuated in response to the presence of spindle 130 at the upper and lower limits of its travel, respectively.

In operation of the illustrative driving and control system of Figs. 2 to 9, the condition represented in those figures corresponds to normal uncaged operation of the gyroscope. Sprindle 130 is at the upper end of its travel, with its lower end spaced above surface of revolusion 74 of the outer gimbal (Fig. 3), so that both gimbals are free. Switch actuating slider 214 is pressed upward by the spindle, with arm 218 maintaining upper limit switch 200 in actuated condition. Uncaged condition of the system is indicated to the operator by lighting of uncaged signal light 187, which is energized by battery 184 via relay switch contact 194 and upper limit switch contact 207. The circuit through motor 160 is open at relay switch contact 197 and at limit switch contact 205. The motor is therefore at rest, and worm gear 169 is effectively locked by worm 168, locking helical gear 153 against rotation in either direction. That condition, in combination with the described action of overrunning clutch 170 prevents appreciable downward movement of spindle 130 in spite of the yielding force exerted by spring 140. Before such downward movement can become apreciable ratchet teeth 172 are engaged by spring arms 178, preventing reverse rotation of the spindle; and further downward movement cannot take place without such rotation of helical gear 150, since gear 153 is locked. The system is therefore effective locked in uncaged condition.

To initiate caging action, control switch 182 is closed, actuating relay switch 190. The circuit through uncaged signal light 187 is thereby opened at contact 194, extinguishing that light; and motor line 199 is grounded via contact 197. Motor line 198 remains connected via normally closed contact 206 of lower limit switch 202 to relay switch contact 196; and relay actuation connects that contact to the positive terminal of battery 184. The motor is thereby energized and rotates in a direction to drive spindle 130 axially downward and in rotation in a forward direction. The axial movement promptly releases switch actuating slider 214 at yoke arm 218, permitting spring 210 of upper limit switch 200 to move the slider downward, deactuating the limit switch. That has no immediate effect, since the switch arm 203 is isolated at open contact 194 of relay switch 190.

The downward axial movement of the spindle, which is preferably aided by spring 140, is of a yielding nature so long as spindle rotation is restrained only by forces of a frictional nature. Over-running clutch 170 typically produces moderate frictional restrainst of forward spindle rotation, thereby aiding downward movement of the spindle, that action being readily variable in design of the clutch. And as soon as spindle driving surface 78 engages the gimbal surfaces, as already described, the friction at that engagement tends further to resist spindle rotation and thereby to produce additional downward thrust. The resulting regenerative action is highly advantageous in producing effective frictional drive of the gimbals. The extent of such regenerative action may be controlled effectively by selection of suitable parameters for the mechanism. The regenerative action varies directly with the radius of driving surface 78, inversely with the radius of helical gear 152, and directly with the helix angle of that gear. It has been found that a helix angle of approximately 45° is capable of giving satisfactory action. The detailed action of the spindle in driving the two gimbals successively to their predetermined caging position and locking them in those positions follows in the manner already described with specific relation to Fig. 1.

The final downward movement of spindle 130, which ocurs only after inner gimbal has been driven to caging position and which locks it in that position, also causes actuation of lower limit switch 202. That opens the motor circuit at contact 206, stopping the motor. Any over-travel of the motor before it comes to rest can cause no harm, since continuing forward spindle rotation is not prevented by completion of the caging action. Actuation of lower limit switch 202 also energizes caged signal light 186 via switch contact 208 and closed relay switch contact 196 indicating to the operator caged condition of the gyroscope. Spring 140, is used, prevents the gyroscope from becoming accidentally uncaged by upward movement of the spindle due to vibration or other causes. That function of spring 140 may be supplemented or replaced by any suitable type of detent structure that yieldably restrains the spindle in caging position, such as a spring-pressed ball detent that engages a circumferential groove in the spindle when the latter is in caging position.

To uncage the gyroscope it is only necessary to open control switch 182, deactuating relay 190. Caged signal light 186 is thereby extinguished by opening of contact 196. Motor line 198 is connected to ground via contact 195, and line 198 is connected to the positive terminal of battery 184 via relay switch contact 194 and normally closed contact 205 of upper limit switch 200, which is still unactuated. The motor is thereby driven in the direction that corresponds to reverse rotation of spindle 130. However, such spindle rotation is prevented by overrunning clutch 170, which is engaged in the existing axial position of the spindle. Helical gear 150 therefore acts as a rack and helical gear 153 acts as a cooperating pinion. The entire reverse torque applied by the motor to driving shaft 152 is therefore expended in producing upward axial movement of spindle 130. The motor thus readily overcomes the weight of the spindle and the yielding force of spring 140 and of a spring detent, if used, and rapidly shifts the spindle by direct axial movement to its upper position. The lower spindle end is thereby withdrawn from the gimbal locking formations, releasing the gyroscope for normal operation.

As the spindle leaves its lower position, lower limit switch 202 is deactuated, causing no immediate effect since its switch arm 204 is isolated at open relay contact 196. As the spindle arrives at its upper position, upper limit switch 200 is actuated, energizing uncaged signal light 187 by closure of contact 207, and opening the motor circuit at contact 205. Continuing rotating of the motor, due to its inertia, is accommodated in the present structure by the limited downward extent of spindle ratchet teeth 172, already described. With that structure, spindle 130 is free to rotate in either direction when in its upper position. When upward spindle movement is stopped at the upper limit of its travel, continuing motor rotation may produce reverse rotation of the spindle, and is therefore not abruptly blocked. Accordingly, after the motor circuit is opened by actuation of the upper limit switch, the motor may coast to a stop without excessive stress of the driving connections.

Fig. 10 represents a modification incorporating several features that may be provided either separately or together. The caging spindle 230 carries a wheel 232 that includes an oblique driving surface 233. Axial advance of the spindle brings that driving surface into frictional engagement with a surface of revolution 236, formed on a flange member 235 which is rigidly mounted on the outer gimbal 240. Spindle rotation then drives the outer gimbal to its predetermined caging position, at which point a recess 237 in surface 236 permits further axial advance of the spindle. In the present embodiment the gimbal is locked in caging position by swinging movement of a latch member 243, which is pivoted on the frame at 244 and is yieldingly urged toward latching position by the spring 245. A latch formation 247 on member 243 enters a cooperating notch 248 in the edge of flange 235, that notch being preferably of V form, so that entry of the latch formation cams the gimbal into precise caging position. Recess 237 may then be of any convenient size, since it is not required to fit a spindle formation accurately. A flange face 246 on the spindle shank, shown as the upper face of wheel 232, extends below the end of latch lever 243 and is so positioned as to lift that lever free of notch 248 when the spindle is at the upper end of its travel. That control of latch lever 243 may be arranged to lower latch formation 247 onto the edge of flange 235 when driving surface 233 engages flange surface 236; or may permit latch operation only when driving surface 233 is received by recess 237.

Axial advance of the spindle also actuates auxiliary driving means for the inner gimbal 242. As illustratively shown, an auxiliary shaft 250 is slidingly journaled by the bracket 251 on the frame of the outer gimbal and carries a frictional driving surface 252 at its lower end. The auxiliary shaft is yieldably urged upward to the normal inactive position of Fig. 10 by the coil spring 253, which bears on stop collar 253a, fixed on the shaft. A wheel 254 is rigidly mounted with respect to the inner gimbal on the end of pivot stud 255, which extends through inner gimbal journal 256. The periphery of wheel 254 is normally closely spaced from driving surface 252, carried by the auxiliary shaft, as shown in Fig. 10, but is frictionally engaged by that surface by virtue of downward axial movement of auxiliary shaft 250. That shaft is controlled from spindle 230 by any suitable type of linkage that produces downward axial movement of the auxiliary shaft in response to downward axial movement of the spindle, and that produces accompanying rotation of the auxiliary shaft in response to spindle rotation. As shown, auxiliary shaft 250 carries at its upper end a wheel 258 with an oblique friction surface 259 adapted to be engaged by surface 233 of spindle wheel 232 only when the latter moves axially downward from its normal position. That engagement moves auxiliary shaft 250 axially downward against the yielding force of spring 253, thereby engaging wheel 254. A frictional driving connection to the inner gimbal is thereby completed, by which spindle rotation drives that gimbal to its predetermined caging position. Any suitable means may be provided for locking the inner gimbal in that position, such as the recess 257 in wheel 254, adapted to fittingly receive surface 252.

Driving surface 252 may be rigidly mounted on auxiliary shaft 250, in which case the vertical clearance between wheel 250 and spindle driving surface 233 is preferably sufficient that the spindle produces driving engagement with wheel 254 on the inner gimbal only after the outer gimbal has been driven to caging position and the spindle driving surface 233 has entered recess 237. The overall function of the caging mechanism is then similar to that of Fig. 1, for example. The alternative structure of Fig. 10, however, is illustrative of the many changes that can be made in the functioning, as well as in the structural arrangement, of the invention.

As shown in Fig. 10, driving surface 252 is rotatively fixed, but is axially movable, with respect to auxiliary shaft 250. Surface 242 is formed on the lower end of a plunger 260, slidably mounted in a coaxial bore 261 in shaft 250 and yieldingly urged downwardly with respect to the shaft by the coil spring 262. A diametral pin 263, fixed in the shaft, is received by the axially elongated slot 264 in plunger 260, preventing relative rotation of the plunger and shaft, and limiting their relative axial movement. That type of mounting of the surface that drives either of the gimbals may be employed, for example, merely to limit the frictional pressure that can be exerted upon the gimbal, and without other change of operation. However, spring 262 further provides an axially yielding linkage between the surfaces (233 and 252 in the present instance) that drives the respective gimbals. With that type linkage, the driving connection to the inner gimbal may be completed independently of the advance of spindle driving surface 233 into recess 237 in the outer gimbal, and hence independently of final positioning of the outer gimbal. That is true, for example, of the present embodiment if the vertical clearance (in uncaged position) between spindle driving surface 233 and outer gimbal surface 236 is made slightly greater than the sum of the vertical clearance between surfaces 233 and 259 and that between surfaces 252 and 254. The driving connection via surface 254 to the inner gimbal is then completed as soon as the outer gimbal approaches near enough to its caging position to bring auxiliary shaft 250 substantially into alignment with spindle 230. Both gimbals are then driven simultaneously until one or the other reaches final caging position. The resilience of spring 262 then permits the element driving that gimbal to advance axially to lock the gimbal in caging position without interfering with the driving connection to the other gimbal.

It may be noted that with the type of latching means shown at 243 in Fig. 10, no further spindle advance may be necessary to lock the outer gimbal in caging position. However, it is still desirable to provide a recess such as 237 in the outer gimbal surface to avoid unnecessary friction after caging of the outer gimbal has been completed. The axial spindle movement on entering recess 237 may be limited by suitable selection of the length of slot 264, so that further spindle movement (if desired for limit switch operation) will occur only when, or if, the inner gimbal is also fully caged.

In a caging system, such, for example, as that of Fig. 10, in which both gimbals may be driven towards caging position simultaneously, it is desirable that the direction in which each gimbal is driven is such that the induced precession of the other gimbal aids, rather than opposes, its driving. Since the direction of precession depends upon the direction of rotation of the gyroscope rotor, the latter direction must be taken into account. In the embodiment of Fig. 10, for example, the described condition may readily be met by reversing, if necessary, the direction of drive of inner gimbal 242, which may be done by reversing wheel 254 on stud 255 so that it is engaged by the opposite side of driving surface 252.

Fig. 11 illustrates schematically a modified arrangement of a caging spindle in accordance with the invention. The axis of spindle 72a of that modification is oblique with respect to both outer gimbal axis 32 and inner gimbal axis 52. Surfaces of revolution on the respective gimbals are indicated at 74a and 76a, both being cylindrical surfaces of revolution with respect to their respective axes. Locking recesses in those two surfaces are indicated at 80a and 84a, respectively. Outer gimbal 30 is driven and locked by respective spindle driving and locking surfaces 78 and 79 similar to those of Fig. 1. Inner gimbal 50 is driven and locked by respective surfaces 78a and 79a of a member 270 which is rotatively fixed with respect to spindle 72a, as by the spline indicated at 271; and which is axially movable. As shown, member 270 is yieldably urged by a spring 272 against the spindle stop flange 273.

Fig. 11 is illustrative of the many arrangements that lie within the broader scope of the invention. It illustrates specifically one way in which it is possible to reduce, to zero if desired, the amount of spindle advance required to drivingly engage the second gimbal surface after the first gimbal has been positioned.

The specific embodiments of the invention that have been shown and described are intended only as illustration, and it will be understood by those skilled in the art that many changes may be made in those embodiments without departing from the proper scope of the invention, which is defined in the appended claims.

I claim:

1. In combination with a gyroscope of the type that includes a frame, a gimbal rotatable with respect to the frame about a gimbal axis, and a rotor carried by the gimbal; caging means for the gimbal, comprising a member mounted on the frame for relative movement in one degree of freedom that comprises rotation about a member axis and for relative movement in another degree of freedom, structure carried by the member and by the gimbal and forming surfaces of revolution with respect to the member axis and the gimbal axis, respectively, said surfaces being interengagable by virtue of member movement in the said other degree of freedom and acting when engaged to drive the gimbal about the gimbal axis by virtue of member movement in the said one degree of freedom, means acting in response to a predetermined rotary position of the gimbal to lock the gimbal in that position, and control means for driving the member in its two said degrees of freedom.

2. In combination with a gyroscope of the type that includes a frame, a gimbal rotatable with respect to the frame about a gimbal axis, and a rotor carried by the gimbal; caging means for the gimbal, comprising a member journaled on the frame for rotary and axial movements with respect to a member axis, structure on the member and on the gimbal forming respective surfaces of revolution with respect to the member axis and the gimbal axis, respectively, said surfaces being interengageable by virtue of axial movement of the member in one direction and acting when engaged to drive the gimbal about the gimbal axis by virtue of member rotation, said engagement acting to limit axial movement of the member in said one direction, means acting in response to a predetermined rotary position of the gimbal to lock the gimbal in that position, and control means actuable to cause rotary movement of the member and to yieldingly urge axial movement of the member in said one direction.

3. In combination with a gyroscope of the type that includes a frame, a gimbal rotatable with respect to the frame about a gimbal axis, and a rotor carried by the gimbal; caging means for the gimbal, comprising a member journaled on the frame for rotary and axial movement with respect to a member axis, friction drive means engageable between the member and the gimbal by virtue of axial movement of the member in one direction, said friction drive means acting when engaged to drive the gimbal to caging position by virtue of member rotation, locking means for the gimbal actuable by virtue of further axial movement of the member in said one dirction when the gimbal is in caging position, first control means actuable to drive the member in its rotary movement and to yieldingly urge it axially in said one direction to cage the gimbal and second control means actuable to move the member axially in the other direction to release the gimbal.

4. In combination with a gyroscope of the type that includes a frame, a gimbal rotatable wtih respect to the frame about a gimbal axis, and a rotor carried by the gimbal; caging means for releasably locking the gimbal in caging position with respect to the frame, and comprising a member journaled on the frame for rotary and axial movement with respect to a member axis, respective driving formations on the member and on the gimbal interengageable by virtue of axial movement of the member in one direction when the gimbal is out of caging position, and acting when engaged and by virtue of member rotation to frictionally drive the gimbal to caging position, said engagement acting to limit axial movement of the member in said one direction respective locking formations on the member and on the gimbal interengageable by virtue of further axial movement of the member only when the gimbal is in caging position and acting when engaged to lock the gimbal in that position, and control means actuable to cause rotary movement of the member and to yieldingly urge axial movement of the member in said one direction.

5. In combination with a gyroscope of the type that includes a frame, a gimbal rotatable with respect to the frame about a gimbal axis, and a rotor carried by the gimbal; caging means for the gimbal, comprising structure on the gimbal forming a surface of revolution with respect to the gimbal axis, a member journaled on the frame for rotary and axial movements with respect to a member axis that is oblique with respect to the surface, a driving formation on the member frictionally engageable with the surface by virtue of axial movement of the member in one direction, the driving formation, when so engaged, acting by virtue of rotation of the member to exert upon the gimbal a torque about the gimbal axis, and control means for driving the member in its rotary and axial movements.

6. In combination with a gyroscope of the type that includes a frame, a gimbal rotatable with respect to the frame about a gimbal axis, and a rotor carried by the gimbal; caging means for the gimbal, comprising structure on the gimbal forming a surface of revolution with respect to the gimbal axis, a member mounted on the frame for relative movement in one degree of freedom that comprises rotation about a member axis and for relative movement in another degree of freedom, a driving formation on the member normally frictionaly engageable with the surface by virtue of member movement in the said other degree of freedom, said frictional engagement acting to limit the movement of the member in that degree of freedom, the surface having a recess adapted to receive the driving formation of the member when the gimbal is in a predetermined position with respect to the frame, and thereby to permit further movement of the member in the said other degree of freedom, cooperating formations on the frame and on the gimbal interengageable by virtue of said further movement of the member, said formations acting when engaged to lock the gimbal against rotation about the gimbal axis, and control means for driving the member in its two said degrees of freedom.

7. In combination with a gyroscope of the type that includes a frame, a gimbal rotatable with respect to the frame about a gimbal axis, and a rotor carried by the gimbal; caging means for the gimbal, comprising structure on the gimbal forming a surface of revolution with respect to the gimbal axis, a member journaled on the frame for rotary and axial movements with respect to a member axis that is oblique with respect to the surface, a driving formation on the member normally frictionally engageable with the surface by virtue of axial movement of the member in one direction, said frictional engagement acting to limit the axial movement of the member in the said direction, the surface having a recess adapted to receive the driving formation of the member when the gimbal is in a predetermined position with respect to the frame, and thereby to permit further axial movement of the member in the said one direction, cooperating formations on the frame and on the gimbal interengageable by virtue of said further axial movement of the member, said formations acting when engaged to lock the gimbal against rotation about the gimbal axis, means actuable to cause rotary movement of the member, and means actuable to yieldingly urge axial movement of the member in the said one direction.

8. In combination with a gyroscope of the type that includes a frame, a gimbal rotatable with respect to the frame about a gimbal axis, and a rotor carried by the gimbal; caging means for the gimbal, comprising structure on the gimbal forming a surface of revolution with respect to the gimbal axis, a member journaled on the frame for rotary and axial movements, a driving formation on the member frictionally engageable with the surface by virtue of axial movement of the member, the surface having a recess adapted to receive the driving formation of the member when the gimbal is in a predetermined position with respect to the frame, entrance of the driving formation into the recess acting to lock the gimbal against rotation about its gimbal axis.

9. In combination with a gyroscope of the type that includes a frame, a gimbal rotatable with respect to the frame about a gimbal axis, and a rotor carried by the gimbal; caging means for releasably locking the gimbal in a predetermined caging position, said caging means comprising structure on the gimbal forming a surface of revolution with respect to the gimbal axis, a member journaled on the frame for rotary and axial movement with respect to a member axis, the member having a generally conical coaxial driving surface and a substantially cylindrical coaxial locking surface adjacent the driving surface, drive means for the rotary movement of the member, and means actuable to yieldingly urge axial movement of the member in a direction to advance the driving surface into driving engagement with the surface of revolution of the gimbal, the latter surface having an aperture adapted to receive the driving surface when the gimbal is in its said caging position, the walls of the aperture including two spacedly opposed wall surfaces adapted to receive between them the locking surface of the member to lock the gimbal in caging position.

10. In combination with a gyroscope of the type that includes a frame, a gimbal rotatable with respect to the frame about a gimbal axis, and a rotor carried by the gimbal; caging means for the gimbal, comprising structure on the gimbal forming a surface of revolution with respect to the gimbal axis, a member journaled on the frame for rotary and axial movements with respect to a member axis that is oblique with respect to the surface, structure on the member forming a driving surface of rveolution oblique with respect to the member axis and frictionally engageable with the surface on the gimbal by virtue of axial movement of the member in one direction, said frictional engagement acting to limit the axial movement of the member in the said direction, the surface on the gimbal having a recess adapted to receive the driving surface when the gimbal is in a predetermined position with respect to the frame, and thereby to permit further axial movement of the member in the said one direction, structure on the member forming a substantially cylindrical surface adjacent the said driving surface, said locking surface being fittingly received within the recess by virtue of said further axial movement of the member, means actuable to cause rotary movement of the member, and means actuable to yieldingly urge axial movement of the member in the said one direction.

11. In combination with a gyroscope of the type that includes a frame, an outer gimbal journaled on the frame on an outer gimbal axis, an inner gimbal journaled on the outer gimbal on an inner gimbal axis, and a rotor carried by the inner gimbal; caging means for the gimbals comprising a member journaled on the frame, driving means for the member, first friction drive means engageable between the member and the outer gimbal and acting when engaged to exert a torque upon the outer gimbal about the outer gimbal axis, second friction drive means engageable between the member and the inner gimbal and acting when engaged to exert a torque upon the inner gimbal about the inner gimbal axis, and control means actuable to cause successive engagement of the first and second friction drive means.

12. In combination with a gyroscope of the type that includes a frame, an outer gimbal journaled on the frame on an outer gimbal axis, an inner gimbal journaled on the outer gimbal on an inner gimbal axis, and a rotor carried by the inner gimbal; caging means for the gimbals comprising a member journaled on the frame, driving means for the member, first friction drive means engageable between the member and the outer gimbal and acting when engaged to exert a torque upon the outer gimbal about the outer gimbal axis, second friction drive means engageable between the member and the inner gimbal and acting when engaged to exert a torque upon the inner gimbal about the inner gimbal axis, and control means actuable to produce yielding engagement of both said first and second friction drive means.

13. In combination with a gyroscope of the type that includes a frame, an outer gimbal journaled on the frame on an outer gimbal axis, an inner gimbal journaled on the outer gimbal on an inner gimbal axis, and a rotor carried by the inner gimbal; caging means for the gimbals comprising a member journaled on the frame, driving means for the member, first friction drive means engageable between the member and the outer gimbal and acting when engaged to exert a torque upon the outer gimbal about the outer gimbal axis, second friction drive means engageable between the member and the inner gimbal and acting when engaged to exert a torque upon the inner gimbal about the inner gimbal axis, and control means actuable to initially cause engagement of the first friction drive means and to then cause engagement of the second friction drive means while the first friction drive means is still engaged, the torque thereby exerted directly upon each gimbal being in the same direction as the precession of that gimbal induced by interaction of rotor rotation with the torque applied to the other gimbal.

14. In combination with a gyroscope of the type that includes a frame, an outer gimbal journaled on the frame on an outer gimbal axis, an inner gimbal journaled on the outer gimbal on an inner gimbal axis, and a rotor carried by the inner gimbal; caging means for the gimbals comprising a member journaled on the frame, driving means for the member, first friction drive means engageable between the member and the outer gimbal and acting when engaged to exert a torque upon the outer gimbal about the outer gimbal axis, second friction drive means engageable between the member and the inner gimbal and acting when engaged to exert a torque upon the inner gimbal about the inner gimbal axis, and control means actuable to cause coexistent engagement of said first and second friction drive means, the torque thereby exerted directly upon each gimbal being in the same direction as the precession of that gimbal induced by interaction of rotor rotation with the torque applied to the other gimbal.

15. In combination with a gyroscope of the type that includes a frame, an outer gimbal journaled on the frame on an outer gimbal axis, an inner gimbal journaled on the outer gimbal on an inner gimbal axis, and a rotor carried by the inner gimbal; caging means for the gimbals comprising a member journaled on the frame for rotary and axial movements with respect to a member axis, first drive means engageable between the member and the outer gimbal in response to a first axial position of the member, second drive means engageable between the member and the inner gimbal in response to a second axial position of the member, driving means for the rotary movement of the member, and control means actuable to shift the member successively to its first and second positions to cause successive engagement of the first and second drive means.

16. In combination with a gyroscope of the type that includes a frame, an outer gimbal journaled on the frame on an outer gimbal axis, an inner gimbal journaled on the outer gimbal on an inner gimbal axis, and a rotar carried by the inner gimbal; caging means for releasably locking the gimbals in respective predetermined caging positions, said caging means comprising a member journaled on the frame for rotary and axial movements with respect to a member axis, drive means actuable to drive the rotary movement of the member, first friction drive means engageable between the member and the outer gimbal in response to a first axial position of the member, second friction drive means engageable between the member and the inner gimbal in response to a second axial position of the member, said friction drive means acting when engaged to exert torques upon the respective gimbals, tending to rotate them into their respective caging positions, control means actuable to actuate the drive means and to shift the member to its said first axial position, and means acting by virtue of caging position of the outer gimbal to shift the member to its said second axial position.

17. In combination with a gyroscope of the type that includes a frame, an outer gimbal journaled on the frame on an outer gimbal axis, an inner gimbal journaled on the outer gimbal on an inner gimbal axis, and a rotor carried by the inner gimbal; caging means for releasably locking the gimbals in respective predetermined caging positions, said caging means comprising a member journaled on the frame for rotary and axial movements with respect to a member axis, control means for driving the rotary movement of the member, means for yieldingly urging axial movement of the member in one direction, first drive means engageable between the member and the outer gimbal in response to axial movement of the member in said one direction, said engagement acting to limit the axial movement of the member in the said one direction, and to exert upon the outer gimbal a torque tending to rotate it to a predetermined caging position, means acting by virtue of caging position of the outer gimbal to disengage the first drive means and thereby to permit further axial movement of the member in the said one direction, and second drive means engageable between the member and the inner gimbal in response to said further axial movement of the member.

18. Caging means as defined in claim 17, and including means acting by virtue of the said further axial movement of the member to lock the outer gimbal in its caging position.

19. Caging means as defined in claim 17, in which engagement of the second drive means acts to limit the said further axial movement of the member, and including means acting by virtue of caging position of the inner gimbal to disengage the second drive means and thereby to permit still further axial movement of the member, and means acting by virtue of the last said movement of the member to lock the inner gimbal in its caging postion.

20. In combination with a gyroscope of the type that includes a frame, an outer gimbal jouraled on the frame on an outer gimbal axis, an inner gimbal journaled on the outer gimbal on an inner gimbal axis, and a rotor carried by the inner gimbal; caging means for releasably locking the gimbals in respective predetermined caging positions, said caging means comprising structure on the respective gimbals forming surfaces of revolution with respect to the respective gimbal axes, a member mounted on the frame for rotation about a member axis, means on the member forming a driving surface of revolution with respect to the member axis, driving means for the rotary movement of the member, and control means actuable to move the driving surface successively into frictional engagement with the respective surfaces of revolution on the respective gimbals.

21. In combination with a gyroscope of the type that includes a frame, an outer gimbal journaled on the frame on an outer gimbal axis, an inner gimbal journaled on the outer gimbal on an inner gimbal axis, and a rotor carried by the inner gimbal; caging means for releasably locking the gimbals in respective predetermined caging positions, said caging means comprising structure on the respective gimbals forming surfaces of revolution with respect to the respective gimbal axes, a member journaled on the frame for rotary and axial movement with respect to a member axis, a driving formation mounted coaxially on the member, drive means for the rotary movement of the member, means actuable to yieldingly urge axial movement of the member in a direction to advance the driving formation axially into driving engagement with the surface of revolution of the outer gimbal, the latter surface having an aperture adapted to receive the driving formation when the outer gimbal is in its said caging position, the surface of revolution of the inner gimbal being engageable by the driving formation when the latter is received in the said aperture.

22. Caging means as defined in claim 21, and including locking formations carried, respectively, by the member and by the outer gimbal and engageable by virtue of axial movement of the member to insert the driving formation into the said aperture, engagement of the locking formations acting to lock the outer gimbal in its said caging postion.

23. In combination with a gyroscope of the type that includes a frame, an outer gimbal journaled on the frame on an outer gimbal axis, an inner gimbal journaled on the outer gimbal on an inner gimbal axis, and a rotor carried by the inner gimbal; caging means for releaseably locking the gimbals in respective predetermined caging positions, said caging means comprising structure on the respective gimbals forming surfaces of revolution with respect to the respective gimbal axes, a member journaled on the frame for rotary and axial movement with respect to a member axis, the member having a generally conical coaxial driving surface and a substantially cylindrical coaxial locking surface adjacent the driving surface, drive means for the rotary movement of the member, means actuable to yieldingly urge axial movement of the member in a direction to advance the driving surface into driving engagement with the surface of revolution of the outer gimbal, the latter surface having an aperture adapted to receive the driving surface when the outer gimbal is in its said caging position, the walls of the aperture including two spacedly opposed wall surfaces adapted to receive between them the locking surface of the member to lock the outer gimbal in caging position, the surface of revolution of the inner gimbal being engageable by the driving surface only when the outer gimbal is so locked.

24. Caging means as defined in claim 23, and in which the said surface of revolution of the inner gimbal has an aperture adapted to receive the said driving surface of the member when the inner gimbal is in its said caging position, the walls of the last said aperture including two spacedly opposed wall surfaces adapted to receive between them the locking surface of the member to lock the inner gimbal in caging position.

25. In a gyroscope caging mechanism of the type that includes a frame, a member journaled on the frame for rotary and axial movements, the member being movable axially in one direction to frictionally engage the gyroscope and in the other direction to disengage the gyroscope, and being movable in forward rotation to drive the gyroscope to caging position; driving means for the member, comprising a driving shaft, intermeshing helical gears on the member and on the shaft, control means for selectively driving the shaft in forward and reverse directions, forward shaft rotation tending to cause forward rotation of the member and tending to move the member axially in said one direction, and clutch means acting between the member and the frame to restrict reverse rotation of the member.

26. In a gyroscope caging mechanism of the type that includes a frame, a member journaled on the frame for rotary and axial movements, the member being movable axially in one direction to frictionally engage the gyroscope and in the other direction to disengage the gyroscope, and being movable in forward rotation to drive the gyroscope to caging position; driving means for the member, comprising a driving shaft, intermeshing helical gears on the member and on the shaft, forward rotation of the driving shaft tending to cause forward rotation of the member and exerting upon the member an axial force tending to move it axially in said one direction, and friction means acting between the member and the frame to yieldingly resist forward member rotation, said friction means thereby increasing the said axial force.

27. In a gyroscope caging mechanism of the type that includes a frame, a member journaled on the frame for rotary and axial movements, the member being movable axially in one direction to frictionally engage the gyroscope and in the other direction to disengage the gyroscope, and being movable in forward rotation to drive the gyroscope to caging position; driving means for the member, comprising a driving shaft, intermeshing helical gears on the member and on the shaft, control means for selectively driving the shaft in forward and reverse directions, forward shaft rotation tending to cause forward rotation of the member and tending to move the member axially in said one direction, and clutch means acting between the member and the frame to restrict reverse rotation of the member, said control means for the driving shaft comprising a motor, control means for selectively energizing the motor, and a driving connection between the motor and the driving shaft, said driving connection acting effectively to lock the shaft against rotation when the motor is unenergized.

28. In a gyroscope caging mechanism of the type that includes a frame, a member journaled on the frame for rotary and axial movements, the member being movable axially to one position to engage the gyroscope and to another position to disengage the gyroscope, and being movable in forward rotation to drive the gyroscope to caging position; driving means for the member, comprising a driving shaft, intermeshing helical gears on the member and on the shaft, clutch means acting between the member and the frame in said one axial position of the member to restrict reverse rotation of the member, the last said means permitting such reverse rotation when the member is in said other axial position, whereby shaft rotation in one direction tends to drive the member rotationally forward and axially in a direction toward said one axial position, and reverse shaft rotation drives the member axially and substantially positively in a direction away from said one axial position only as far as said other axial position, and control means for selectively driving the shaft in said forward and reverse directions.

29. Driving means for a gyroscope caging mechanism as defined in claim 26, and in which said clutch means comprise cooperating sets of ratchet formations mounted respectively on the member and on the frame, the axial extent of said formations being so limited that the sets of formations are in mutually operative relation when the member is in said one axial position, and are mutually spaced axially of the member when the latter is in said other axial position.

30. In a gyroscope caging mechanism of the type that includes a frame, a member journaled on the frame for rotary and axial movements, the member being movable axially to a first position to engage the gyroscope and to a second position to disengage the gyroscope, and being movable in forward rotation to drive the gyroscope to caging position; dirving means for member, comprising a driving shaft, intermeshing helical gears on the member and on the shaft, a reversible electric motor drivingly connected to the driving shaft, forward motor rotation tending to cause forward rotation of the member and to move the member axially toward its said first position, and reverse motor rotation tending to move the member axially toward its said second position, and control means for the motor comprising a remote control switch, first and second limit switches actuable respectively in response to said first and second axial positions of the member, and circuit means including said switches and acting to drive the motor forwardly in response to one position of the control switch and to actuation of the second limit switch, and acting to drive the motor in the other direction in response to the other position of the control switch and to actuation of the first limit switch.

31. In a gyroscope mechanism, a frame, a member journaled on the frame for rotary and axial movements, the member being movable axially in one direction to engage the gyroscope and in the other direction to disengage the gyroscope, and being movable in rotation in a forward direction to drive the gyroscope to caging position, a driving shaft, intermeshing helical gears on the member and on the shaft, power means actuable to drive the shaft in a direction tending to cause forward rotation of the member and tending to move the member axially in said one direction to engage the gyro and drive it to caging position, releasable clutch means between the said power means and the member, and means actuable to release the clutch means and to apply to the member a force tending to move it axially in the other direction to release the gyro.

References Cited in the file of this patent

UNITED STATES PATENTS

| | | |
|---|---|---|
| 1,860,230 | Brown | May 24, 1932 |
| 2,200,976 | Bates | May 14, 1940 |
| 2,369,845 | Noxon | Feb. 20, 1945 |
| 2,383,663 | MacCallum et al. | Aug. 28, 1945 |
| 2,422,120 | Noble | June 10, 1947 |